United States Patent
Kim et al.

(10) Patent No.: US 9,336,398 B2
(45) Date of Patent: May 10, 2016

(54) APPARATUS AND METHOD FOR MANIFESTING EVENT TO VERIFY SECURITY OF MOBILE APPLICATION

(71) Applicant: ELECTRONICS AND TELECOMMUNICATIONS RESEARCH INSTITUTE, Daejeon (KR)

(72) Inventors: Dong-Phil Kim, Daejeon (KR); Jun-Young Choi, Gyeryong-si (KR); Tae-Hyung Kim, Daejeon (KR); Ji-Eun Lee, Daejeon (KR); Hyung-Geun Oh, Daejeon (KR); Kiwook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 37 days.

(21) Appl. No.: 14/337,306

(22) Filed: Jul. 22, 2014

(65) Prior Publication Data

US 2015/0067868 A1   Mar. 5, 2015

(30) Foreign Application Priority Data

Sep. 3, 2013  (KR) .......................... 10-2013-0105325

(51) Int. Cl.
*G06F 11/36* (2006.01)
*G06F 21/57* (2013.01)
*H04L 29/06* (2006.01)
*G06F 21/56* (2013.01)

(52) U.S. Cl.
CPC .............. *G06F 21/577* (2013.01); *H04L 63/00* (2013.01); *G06F 2221/034* (2013.01)

(58) Field of Classification Search
CPC .... H04W 4/006; H04W 4/22; H04L 63/1441; H04L 29/06877
See application file for complete search history.

(56) References Cited

FOREIGN PATENT DOCUMENTS

| JP | 2010-218496 A | 9/2010 |
| JP | 2011-028438 A | 2/2011 |
| KR | 10-2009-0065144 A | 6/2009 |
| KR | 10-0932603 B1 | 12/2009 |

OTHER PUBLICATIONS

A Mobile Phone Malicious Software Detection Model with Behavior Checker. Yap et al. 2005.*

(Continued)

*Primary Examiner* — Venkat Perungavoor
(74) *Attorney, Agent, or Firm* — LRK Patent Law Firm

(57) ABSTRACT

An apparatus and method for manifesting an event to verify the security of a mobile application are provided. The apparatus for manifesting an event to verify the security of a mobile application includes a tester application production unit, a tester application execution unit, and a tester application daemon execution unit. The tester application production unit produces a tester application for testing an application to be tested based on application information which is extracted from the application to be tested. The tester application execution unit executes the application to be tested by manifesting an event included in the extracted application information, and extracts a user view object output to a screen of a smart device when the application to be tested is executed. The tester application daemon execution unit generates a touch event based on the extracted user view object, and performs a screen change.

12 Claims, 7 Drawing Sheets

(56) References Cited

OTHER PUBLICATIONS

Mobile Security Catching Up? Revealing the Nuts and Bolts of the Security of Mobile Devices. Becher et al. IEEE(2011).*
An Android Application Sandbox System for Suspicious Software Detection. Biasing et al. IEEE(2010).*
A Whitebox Approach for Automated Security Testing of Android Applications on the Cloud. Mahmood et al. IEEE(2012).*
Riyadh Mahmood et al, "A Whitebox Approach for Automated Security Testing of Android Applications on the Cloud," In proceedings of the 7th International Workshop on Automation of Software Test, 2012, pp. 22-28, Zurich, Switzerland.

* cited by examiner

APPARATUS AND METHOD FOR MANIFESTING EVENT TO VERIFY SECURITY OF MOBILE APPLICATION

CROSS-REFERENCE TO RELATED APPLICATION

This application claims the benefit of Korean Patent Application No. 10-2013-0105325, filed on Sep. 3, 2013, which is hereby incorporated by reference in its entirety into this application.

BACKGROUND OF THE INVENTION

1. Technical Field

The present invention relates generally to an apparatus and method for manifesting an event to verify the security of a mobile application and, more particularly, to an apparatus and method for manifesting an event to verify the security of a mobile application in order to verify the security of the mobile application before the mobile application is delivered to a user.

2. Description of the Related Art

With the recent explosive spread of smart devices, a large number of mobile applications for providing various types of services including Internet banking have been developed. As existing PC-based attacks have spread into smart devices in line with the above-described change, cases where mobile applications are forged or falsified and disguised as normal applications, users are induced to install the disguised applications and then the installed applications attach smart devices have rapidly increased.

Such types of attacks based on mobile applications are characterized in that specific system events, such as a short message service (SMS) reception event, are received when mobile applications operate and malicious actions are automatically generated or are generated a specific time after the mobile applications have been executed.

Furthermore, recently, there are cases where a malicious action is manifested only when user input, such as clicking on a button, is performed after an application has been executed. An app-in-app type attack, which is a representative one of the above cases, corresponds to a case where after a normal application has been installed, a malicious application disguised as the normal application is also installed, which requires user input. These types of attacks are not detected by a security system if a tester does not actually operate after applications to be tested have been installed.

In Korea, research into a behavior automatic manifestation technique for testing the security of a mobile application has not been reported yet. As disclosed in Korean Patent No. 10-0932603, a method of manifesting a GUI to test the reliability of a mobile application has been chiefly researched. An application function automation technique is applied to such a GUI manifest method under the condition that an application verifier is previously aware of the configuration of a GUI and a basic operation scenario. If the function of an application is not known, the scenario of the application is checked using software reverse-engineering technology and then a GUI test is performed.

The conventional methods are problematic in that they cannot be applied to situations in which the scenario of an application is not known in advance and the security of a large number of applications needs to be rapidly tested.

SUMMARY OF THE INVENTION

Accordingly, the present invention has been made keeping in mind the above problems occurring in the conventional art, and an object of the present invention is to provide an apparatus and method for manifesting an event to verify the security of a mobile application in order to verify the security of the mobile application before the mobile application is delivered to a user.

Another object of the present invention is to provide an apparatus and method for manifesting an event to verify the security of a mobile application, which automatically manifests an event included in a mobile application.

In accordance with an aspect of the present invention, there is provided an apparatus for manifesting an event to verify the security of a mobile application, including a tester application production unit configured to produce a tester application for testing an application to be tested based on application information which is extracted from the application to be tested; a tester application execution unit configured to execute the application to be tested by manifesting an event included in the extracted application information, and to extract a user view object output to a screen of a smart device when the application to be tested is executed; and a tester application daemon execution unit configured to generate a touch event based on the extracted user view object, and to perform a screen change.

The application information may include any one of a package name, activity name, event and instruction of the application to be tested.

The tester application production unit may include an information extraction unit configured to extract the application information from the application to be tested; an application generation unit configured to generate the tester application based on the application information; an application installation unit configured to install the application to be tested and the tester application on the smart device; and an application setting unit configured to establish a test policy of the tester application.

The application setting unit may establish the test policy of any one of items to be tested, a sequence of the items, a number of screen changes, a standby time to be taken after the user view object is executed and a test execution time to be taken after the event is manifested.

The tester application execution unit may include an event manifestation unit configured to manifest the event extracted from the application to be tested; a time control unit configured to change a text execution time from a test execution time of the tester application to a predetermined test execution time; and a user view object extraction unit configured to extract the user view object to be output to the screen of the smart device when the application to be tested is executed.

The tester application daemon execution unit may include a touch event generation unit configured to generate the touch event based on the extracted user view object, and to execute the user view object; a screen change detection unit configured to determine whether or not a screen change has occurred in the smart device after the user view object has been executed; and a screen change determination unit configured to determine whether or not to maintain a changed screen based on a predetermined number of screen changes.

The screen change detection unit may determine whether or not a screen change has occurred by comparing the activity name of the changed screen with the activity name of an existing screen.

The screen change determination unit may compare the number of screen changes of the changed screen with the predetermined number of screen changes, may change a screen from the changed screen to a previous screen if, as a result of the comparison, the number of screen changes of the changed screen is larger than the predetermined number of screen changes, and may maintain the changed screen if, as a result of the comparison, the number of screen changes of the changed screen is not larger than the predetermined number of screen changes.

In accordance with another aspect of the present invention, there is provided a method of manifesting an event to verify the security of a mobile application, including producing, by a tester application production unit, a tester application for testing an application to be tested based on application information which is extracted from the application to be tested; executing, by a tester application execution unit, the application to be tested by manifesting an event included in the extracted application information, and extracting, by the tester application execution unit, a user view object output to a screen of a smart device when the application to be tested is executed; and generating, by a tester application daemon execution unit, a touch event based on the extracted user view object, and performing, by the tester application daemon execution unit, a screen change.

Producing the tester application may include extracting the application information from the application to be tested; generating the tester application based on the application information; installing the application to be tested and the tester application in the smart device; and establishing a test policy of the tester application.

Extracting the user view object output to the screen of the smart device may include manifesting the event extracted from the application to be tested; changing a test execution time from a test execution time of the tester application to a predetermined test execution time; and extracting the user view object to be output to the screen of the smart device when the application to be tested is executed.

Generating the touch event and performing the screen change may include determining a view object to be executed based on the extracted user view object, generating the touch event, and executing the user view object; determining whether or not a screen change has occurred in the smart device after the user view object has been executed; and determining whether or not to maintain a changed screen based on a predetermined number of screen changes.

Determining whether or not a screen change has occurred in the smart device may include determining whether or not a screen change has occurred by comparing an activity name of the changed screen with an activity name of an existing screen.

Determining whether or not to maintain the changed screen may include comparing a number of screen changes of the changed screen with the predetermined number of screen changes; changing a screen from the changed screen to a previous screen if, as a result of the comparison, the number of screen changes of the changed screen is larger than the predetermined number of screen changes; and maintaining the changed screen if, as a result of the comparison, the number of screen changes of the changed screen is not larger than the predetermined number of screen changes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
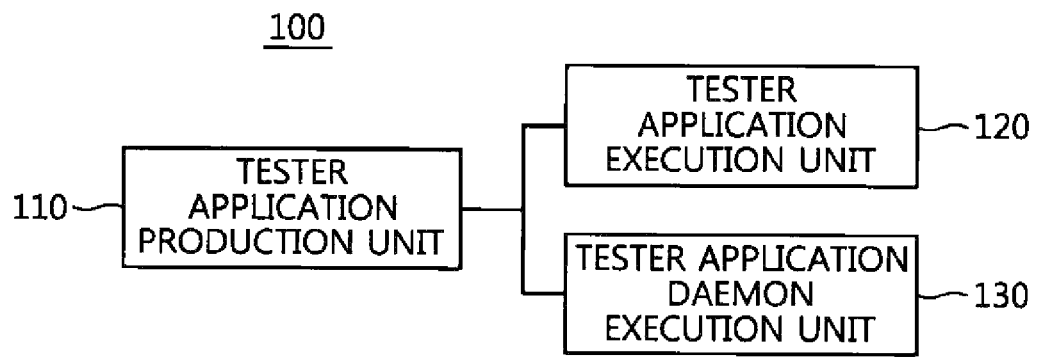
FIGS. 1 and 2 are diagrams illustrating the configuration of an apparatus for manifesting an event to verify the security of a mobile application according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

An apparatus and method for manifesting an event to verify the security of a mobile application according to embodiments of the present invention are described below.

Figure 2:
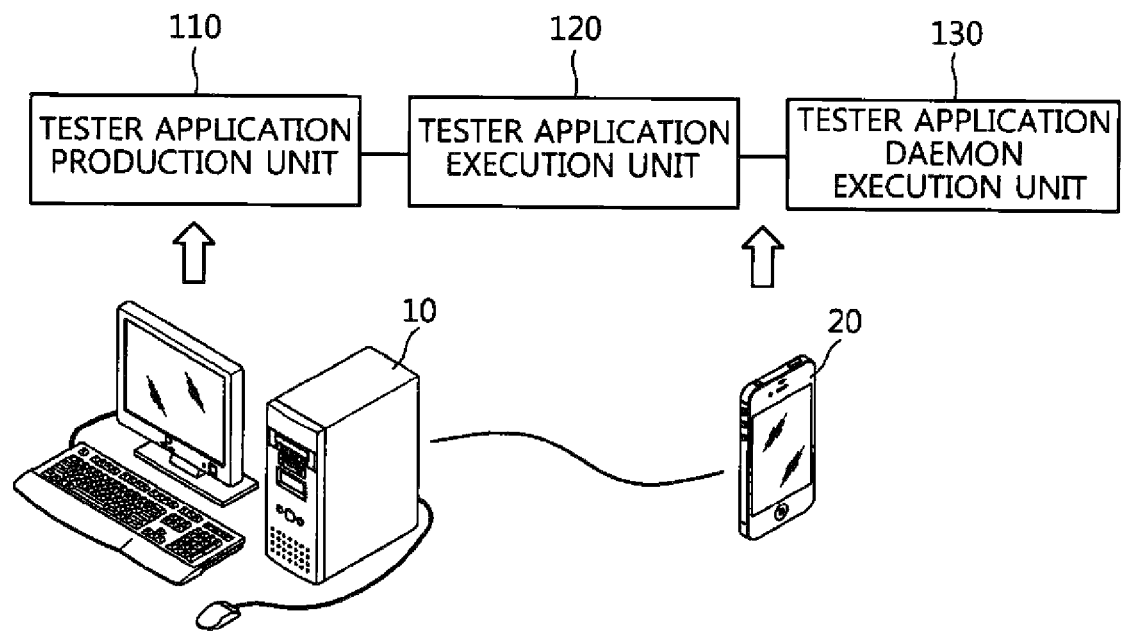

FIGS. 1 and 2 are diagrams illustrating the configuration of an apparatus for manifesting an event to verify the security of a mobile application according to an embodiment of the present invention.

Referring to FIGS. 1 and 2, the apparatus 100 for manifesting an event to verify the security of a mobile application according to an embodiment of the present invention basically includes a tester application production unit 110, a tester application execution unit 120, and a tester application daemon execution unit 130.

The tester application production unit 110 produces a tester application for testing an application to be tested based on application information that is extracted from the application to be tested. The application information includes any one of the package name, activity name, event (called "intent" in the case of the Android OS) and instruction of the application to be tested.

The tester application production unit 110 operates on a PC of an application verifier, dynamically produces a tester application that will perform a test, and is installed on a smart device along with the application to be tested.

The tester application execution unit 120 executes the tester application so that at least one user view object to be output to the screen of a smart device is extracted when the application to be tested is executed by manifesting an event included in the extracted application information. That is, the tester application execution unit 120 manifests an event, and manifests the function of the mobile application to be tested while executing the user view object extracted from the mobile application, based on a predetermined test execution time.

The tester application daemon execution unit 130 generates a touch event based on the extracted user view object, and executes the daemon of the tester application which performs a screen change.

As described above, the tester application production unit 110 operates on the PC of the application verifier, and the tester application execution unit 120 and the tester application daemon execution unit 130 operate on a smart device. That is, the tester application is installed on a smart device by the tester application production unit 110 as described above, and the daemon of the tester application is installed on a smart device before an application verifier performs a test, and operates as a background.

Figure 3:
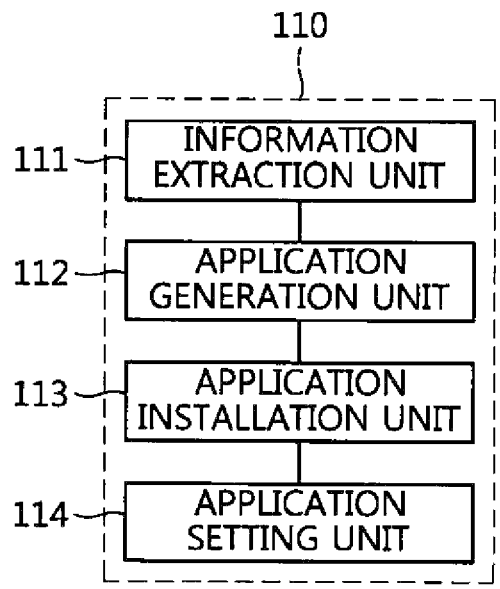
FIG. 3 is a diagram illustrating the detailed configuration of a tester application production unit adopted in the apparatus for manifesting an event to verify the security of a mobile application according to an embodiment of the present invention.
Figure 6:
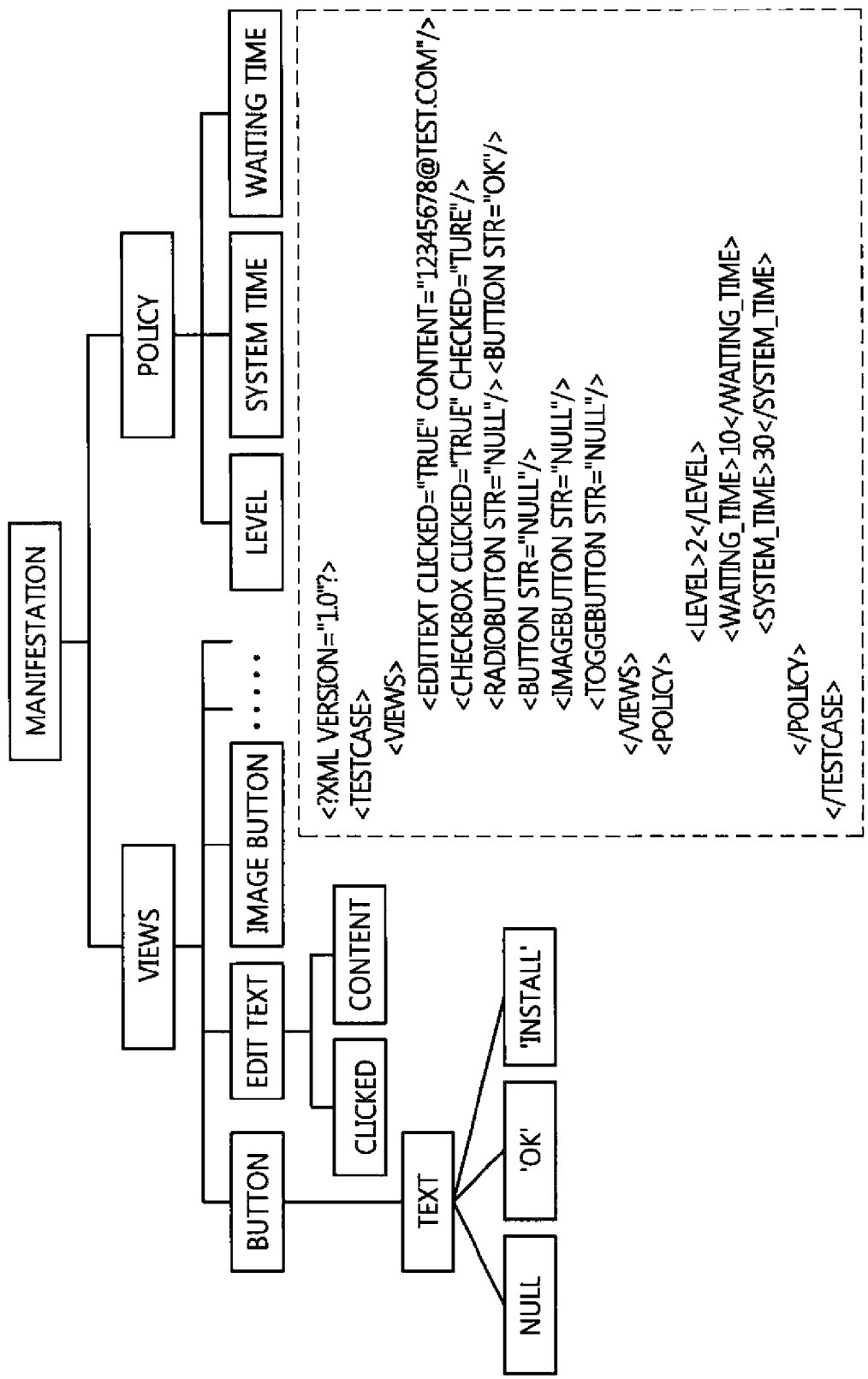
FIG. 6 is a diagram illustrating the structure of a test case and a specification language used to write the test case according to an embodiment of the present invention.

FIG. 3 is a diagram illustrating the detailed configuration of the tester application production unit adopted in the apparatus for manifesting an event to verify the security of a mobile application according to an embodiment of the present invention. FIG. 6 is a diagram illustrating the structure of a test case and a specification language used to write the test case according to an embodiment of the present invention.

Referring to FIG. 3, the tester application production unit 110 according to this embodiment of the present invention produces a tester application for testing an application to be tested based on application information that is extracted from the application to be tested.

For this purpose, the tester application production unit 110 includes an information extraction unit 111, an application generation unit 112, an application installation unit 113, and an application setting unit 114.

The information extraction unit 111 extracts the application information from the application to be tested. The information extraction unit 111 extracts the package and activity names of the application to be tested and an event used in the application to be tested.

The application generation unit 112 generates a tester application based on the extracted application information. The application generation unit 112 generates the tester application for testing the application to be tested.

The application installation unit 113 installs the application to be tested and the tester application on a smart device. The application installation unit 113 sends the application to be tested and the tester application to the smart device over a wired or wireless network.

The application setting unit 114 establishes the test policy of the tester application. In this case, the application setting unit 114 establishes the test policy of any one of test items and a sequence to be executed by the test application execution unit 120, the number of screen changes occurring when a test is performed, and standby time to be taken after the user view object is executed and test execution time to be taken after the event is manifested. In this case, the number of screen changes is a criterion for the number of times that the event will be manifested.

The application setting unit 114 may write the test policy in a specification language, such as that shown in FIG. 6. In this case, objects to be manifested are classified based on view objects requiring user input. In greater detail, the test policy specifies the number of screen changes indicative of the number of times that a screen change will be performed, a standby time indicative of seconds for which waiting is performed after user view objects are executed, and a test execution time.

Figure 4:
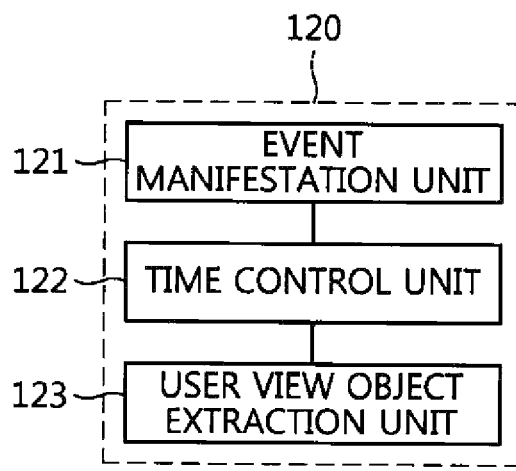
FIG. 4 is a diagram illustrating the detailed configuration of a tester application execution unit adopted in the apparatus for manifesting an event to verify the security of a mobile application according to an embodiment of the present invention.

FIG. 4 is a diagram illustrating the detailed configuration of the tester application execution unit 120 adopted in the apparatus for manifesting an event to verify the security of a mobile application according to an embodiment of the present invention.

Referring to FIG. 4, the tester application execution unit 120 according to this embodiment of the present invention executes a tester application so that at least one user view object to be output to a screen of a smart device is extracted when the test application is executed by manifesting an event included in extracted application information.

For this purpose, the tester application execution unit 120 includes an event manifestation unit 121, a time control unit 122, and a user view object extraction unit 123.

The event manifestation unit 121 manifests an event extracted from an application to be tested.

The time control unit 122 changes a test execution from the test execution time of the tester application to a predetermined test execution time. The time control unit 122 sets the test execution time of a tester application as a predetermined test execution time before an application verifier performs a test, that is, a test execution time set by the application setting unit 114. The user view object extraction unit 123 extracts at least one user view object to be output to a screen of a smart device when the application to be tested is executed.

As described above, in order for the tester application to be executed, the event manifestation unit 121 is executed first, and the time control unit 122 and the user view object extraction unit 123 are then sequentially executed.

Figure 5:
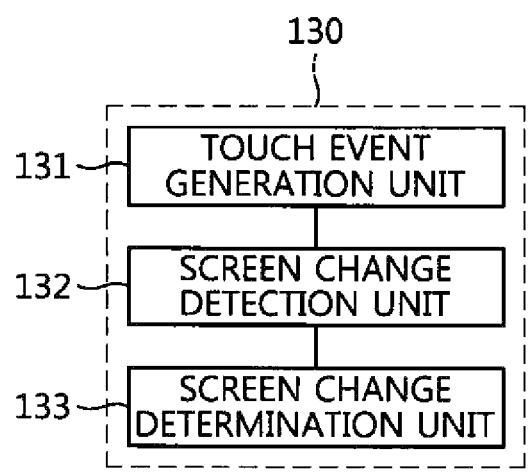
FIG. 5 is a diagram illustrating the detailed configuration of a tester application daemon execution unit adopted in the apparatus for manifesting an event to verify the security of a mobile application according to an embodiment of the present invention.

FIG. 5 is a diagram illustrating the detailed configuration of the tester application daemon execution unit 130 adopted in the apparatus for manifesting an event to verify the security of a mobile application according to an embodiment of the present invention.

Referring to FIG. 5, the test application daemon execution unit 130 according to an embodiment of the present invention generates a touch event based on an extracted user view object, and performs a screen change.

For this purpose, the tester application daemon execution unit 130 includes a touch event generation unit 131, a screen change detection unit 132, and a screen change determination unit 133.

The touch event generation unit 131 generates a touch event based on an extracted user view object, and executes the user view object. That is, the touch event generation unit 131 generates a touch event in the user view object extracted by the test application execution unit 120. The touch event refers to a user input event.

The screen change detection unit 132 detects whether or not a screen change has occurred in a smart device after a user view object has been executed. The screen change detection unit 132 may detect whether or not a screen change has occurred by comparing the activity name of a changed screen with the activity name of an existing screen.

The screen change determination unit 133 determines whether or not to maintain the changed screen based on the predetermined number of screen changes. The screen change determination unit 133 compares the number of screen changes of the changed screen with the predetermined number of screen changes. If, as a result of the comparison, the number of screen changes of a changed screen is found to be greater than the predetermined number of screen changes, the screen change determination unit 133 changes a screen from the changed screen to a previous screen. If, as a result of the comparison, the number of screen changes of a changed screen is found to be not larger than the predetermined number of screen changes, the screen change determination unit 133 maintains the changed screen. The reason for this is that if a touch event is manifested without previously setting the number of screen changes, all user view objects included in an application may not be executed. Accordingly, if there is no user view object that will generate a touch event at any moment, the screen change determination unit 133 needs to return to a previous screen and perform a touch event for a user view object that has not generated a touch event. However, since it is difficult to record touch events, the number of screen changes is fixed, and thus user view objects that have been manifested and user view objects that have not been manifested are recorded. In this case, a maximum number of user view objects may be manifested.

Figure 7:
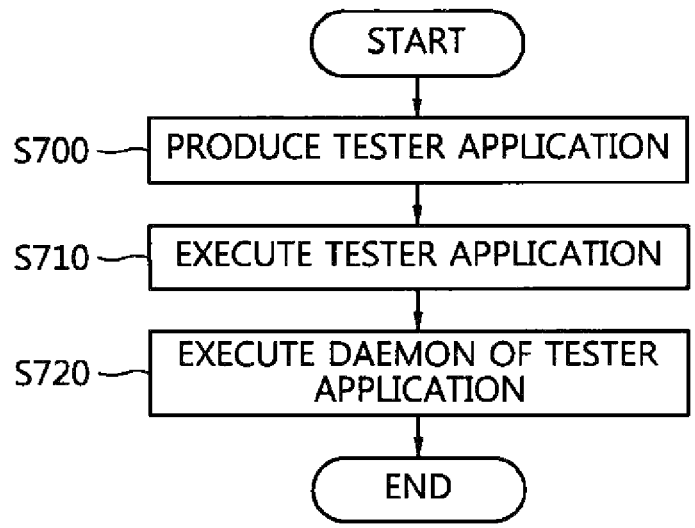
FIG. 7 is a flowchart illustrating a method of manifesting an event to verify the security of a mobile application according to an embodiment of the present invention.

FIG. 7 is a flowchart illustrating a method of manifesting an event to verify the security of a mobile application according to an embodiment of the present invention.

Referring to FIG. 7, the method of manifesting an event to verify the security of a mobile application according to an embodiment of the present invention is a method using the apparatus 100 for manifesting an event to verify the security of a mobile application. In the following description, redundant descriptions are omitted.

First, the tester application production unit 110 produces a tester application for testing an application to be tested based on application information that is extracted from the application to be tested at step S700. At step S700, the tester application production unit 110 dynamically produces the tester application that will perform tests, and the produced tester application is installed on a smart device along with the application to be tested.

The tester application execution unit 120 executes the tester application so that at least one user view object to be output to a screen of the smart device is extracted when the application to be tested is executed by manifesting an event included in the extracted application information at step S710. At step S710, the tester application execution unit 120 manifests the function of a mobile application while executing the user view object extracted from the application to be tested based on a predetermined test execution time by manifesting the event.

The tester application daemon execution unit 130 generates a touch event based on the extracted user view object and performs a screen change at step S720.

Figure 8:
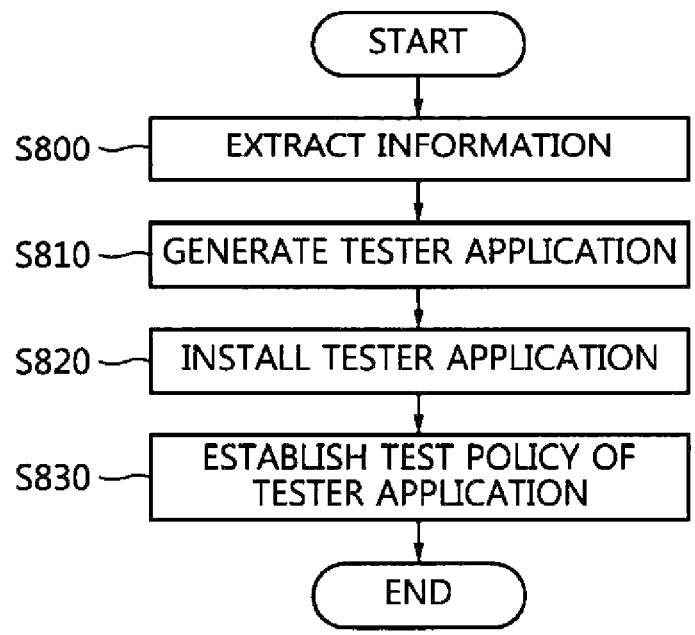
FIG. 8 is a flowchart illustrating a method of producing a tester application in the method of manifesting an event to verify the security of a mobile application according to an embodiment of the present invention.

FIG. 8 is a detailed flowchart illustrating a method of producing a tester application in the method of manifesting an event to verify the security of a mobile application according to an embodiment of the present invention.

Referring to FIG. 8, in the method of producing a tester application according to an embodiment of the present invention, that is, step S700, first, application information is extracted from the application to be tested at step S800.

A tester application for testing the application to be tested is generated based on the application information at step S810.

The application to be tested and the tester application are installed on a smart device at step S820.

The test policy of the tester application is established at step S830. At step S830, the test policy of any one of the number of screen changes when a test is performed by the test application execution unit 120, a standby time to be taken after a user view object is executed and a test execution time to be taken after an event is manifested is established.

Figure 9:
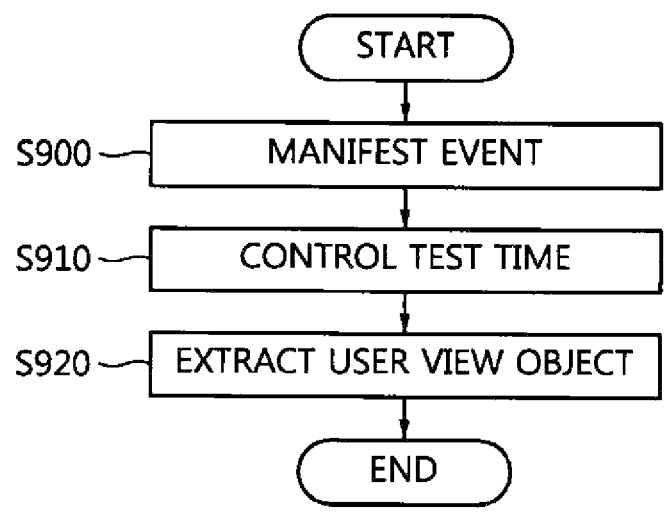
FIG. 9 is a flowchart illustrating a method of executing a tester application in the method of manifesting an event to verify the security of a mobile application according to an embodiment of the present invention.

FIG. 9 is a flowchart illustrating a method of executing a tester application in the method of manifesting an event to verify the security of a mobile application according to an embodiment of the present invention.

Referring to FIG. 9, in the method of executing a tester application according to an embodiment of the present invention, that is, step S710, first, an event extracted from an application to be tested is manifested at step S900.

Thereafter, the test execution time of the tester application is changed into a predetermined test execution time at step S910.

Thereafter, when the application to be tested is executed, user view objects to be output to a screen of a smart device are extracted and a user view object to be executed is determined at step S920.

Figure 10:
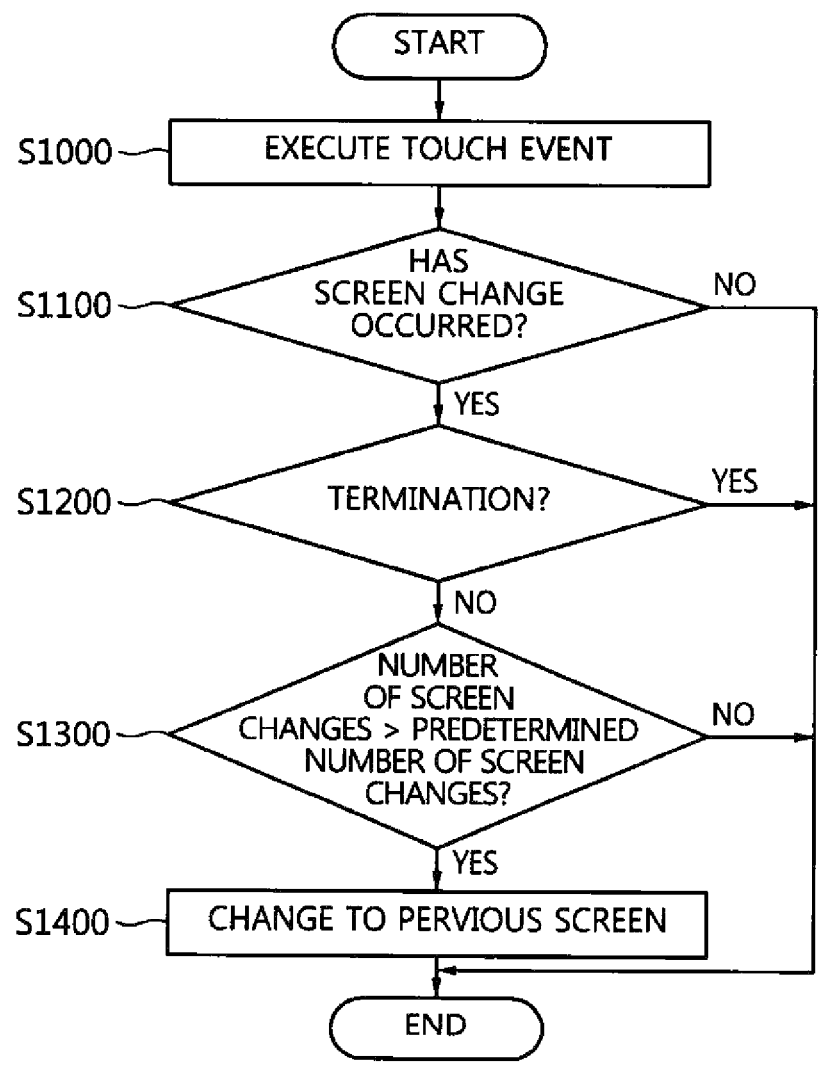
FIG. 10 is a flowchart illustrating a method of executing the daemon of a tester application in the method of manifesting an event to verify the security of a mobile application according to an embodiment of the present invention.

FIG. 10 is a flowchart illustrating a method of executing the daemon of a tester application in the method of manifesting an event to verify the security of a mobile application according to an embodiment of the present invention.

Referring to FIG. 10, in the method of executing the daemon of a tester application according to an embodiment of the present invention, that is, step S720, first, a touch event is generated based on an extracted user view object and the user view object is executed at step S1000.

After the user view object is executed, whether or not a screen change has occurred in a smart device is determined at step S1100. The screen change detection unit 132 determines whether or not a screen change has occurred by comparing the activity name of a changed screen with the activity name of an existing screen.

Whether or not to maintain the changed screen is determined based on the predetermined number of screen changes at step S1200. In this case, if the user view object being executed is an end button, the tester application is terminated. If the user view object being executed is not an end button, whether or not the number of screen changes of the changed screen is larger than the predetermined number of screen changes is determined at step S1300. If, as a result of the determination, it is determined that the number of screen changes of the changed screen is larger than the predetermined number of screen changes, a screen is changed from the changed screen to a previous screen at step S1400. If, as a result of the determination, it is determined that the number of screen changes of the changed screen is not larger than the predetermined number of screen changes, the changed screen is maintained. More particularly, if the number of screen changes of the changed screen is larger than the predetermined number of screen changes, the screen is changed from the changed screen to the previous screen and the process then returns to step S800. If the number of screen changes of the changed screen is not larger than the predetermined number of screen changes, the process returns to step S800.

The present invention can detect a malicious action included in an application to be tested through the screen change described above.

As described above, the apparatus and method for manifesting an event to verify the security of a mobile application according to the embodiments of the present invention have the advantage of improving the reliability and security of a mobile application by verifying the security of the mobile application before the mobile application is delivered to a user.

Furthermore, the apparatus and method for manifesting an event to verify the security of a mobile application according to the embodiments of the present invention have the advantage of rapidly and precisely detecting a malicious action generated in response to a specific event after a mobile application is installed or a malicious action generated in response to a user touch event by automatically manifesting an event included in the mobile application.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manifesting an event to verify security of a mobile application, comprising:
   a tester application production unit configured to produce a tester application for testing an application to be tested based on application information which is extracted from the application to be tested;
   a tester application execution unit configured to execute the application to be tested by manifesting an event included in the extracted application information, and to extract a user view object output to a screen of a smart device when the application to be tested is executed; and
   a tester application daemon execution unit configured to generate a touch event based on the extracted user view object, and to perform a screen change,
   wherein the tester application daemon execution unit comprises:
   a touch event generation unit configured to generate the touch event based on the extracted user view object, and to execute the user view object;
   a screen change detection unit configured to determine whether or not a screen change has occurred in the smart device after the user view object has been executed; and
   a screen change determination unit configured to determine whether or not to maintain a changed screen based on a predetermined number of screen changes.

2. The apparatus of claim 1, wherein the application information comprises any one of a package name, activity name, event and instruction of the application to be tested.

3. The apparatus of claim 1, wherein the tester application production unit comprises:
   an information extraction unit configured to extract the application information from the application to be tested;
   an application generation unit configured to generate the tester application based on the application information;
   an application installation unit configured to install the application to be tested and the tester application on the smart device; and
   an application setting unit configured to establish a test policy of the tester application.

4. The apparatus of claim 3, wherein the application setting unit establishes the test policy of any one of items to be tested, a sequence of the items, a number of screen changes, a standby time to be taken after the user view object is executed and a test execution time to be taken after the event is manifested.

5. The apparatus of claim 1, wherein the tester application execution unit comprises:
   an event manifestation unit configured to manifest the event extracted from the application to be tested;
   a time control unit configured to change a text execution time from a test execution time of the tester application to a predetermined test execution time; and
   a user view object extraction unit configured to extract the user view object to be output to the screen of the smart device when the application to be tested is executed.

6. The apparatus of claim 1, wherein the screen change detection unit determines whether or not a screen change has occurred by comparing an activity name of the changed screen with an activity name of an existing screen.

7. The apparatus of claim 1, wherein the screen change determination unit compares a number of screen changes of the changed screen with the predetermined number of screen changes, changes a screen from the changed screen to a previous screen if, as a result of the comparison, the number of screen changes of the changed screen is larger than the predetermined number of screen changes, and maintains the changed screen if, as a result of the comparison, the number of screen changes of the changed screen is not larger than the predetermined number of screen changes.

8. A method of manifesting an event to verify security of a mobile application, comprising:
   producing, by a tester application production unit, a tester application for testing an application to be tested based on application information which is extracted from the application to be tested;
   executing, by a tester application execution unit, the application to be tested by manifesting an event included in the extracted application information, and extracting, by the tester application execution unit, a user view object output to a screen of a smart device when the application to be tested is executed; and
   generating, by a tester application daemon execution unit, a touch event based on the extracted user view object, and performing, by the tester application daemon execution unit, a screen change,
   wherein generating the touch event and performing the screen change comprises:
   determining a view object to be executed based on the extracted user view object, generating the touch event, and executing the user view object;
   determining whether or not a screen change has occurred in the smart device after the user view object has been executed; and
   determining whether or not to maintain a changed screen based on a predetermined number of screen changes.

9. The method of claim 8, wherein producing the tester application comprises:
   extracting the application information from the application to be tested;
   generating the tester application based on the application information;
   installing the application to be tested and the tester application in the smart device; and
   establishing a test policy of the tester application.

10. The method of claim 8, wherein extracting the user view object output to the screen of the smart device comprises:
    manifesting the event extracted from the application to be tested;
    changing a test execution time from a test execution time of the tester application to a predetermined test execution time; and
    extracting the user view object to be output to the screen of the smart device when the application to be tested is executed.

11. The method of claim 8, wherein determining whether or not a screen change has occurred in the smart device comprises determining whether or not a screen change has occurred by comparing an activity name of the changed screen with an activity name of an existing screen.

12. The method of claim 8, wherein determining whether or not to maintain the changed screen comprises:
   comparing a number of screen changes of the changed screen with the predetermined number of screen changes;
   changing a screen from the changed screen to a previous screen if, as a result of the comparison, the number of screen changes of the changed screen is larger than the predetermined number of screen changes; and
   maintaining the changed screen if, as a result of the comparison, the number of screen changes of the changed screen is not larger than the predetermined number of screen changes.

* * * * *